US011953175B2

(12) United States Patent
Ruan et al.

(10) Patent No.: US 11,953,175 B2
(45) **Date of Patent: *Apr. 9, 2024**

(54) DEICING SYSTEM FOR AN AUTOMOTIVE LAMP

(71) Applicant: Grote Industries, Inc., Madison, IN (US)

(72) Inventors: Jiabiao Ruan, Madison, IN (US); Sankalp Pampattiwar, Madison, IN (US); Ammar Ali, Madison, IN (US); Cesar Perez-Bolivar, Madison, IN (US)

(73) Assignee: Grote Industries, Inc., Madison, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/648,615

(22) Filed: Jan. 21, 2022

(65) Prior Publication Data

US 2022/0341563 A1 Oct. 27, 2022

Related U.S. Application Data

(63) Continuation of application No. 16/901,203, filed on Jun. 15, 2020, now Pat. No. 11,255,508.

(51) Int. Cl.

*F21S 45/60* (2018.01)
*F21S 41/20* (2018.01)
(Continued)

(52) U.S. Cl.

CPC ............. *F21S 45/60* (2018.01); *F21S 41/285* (2018.01); *F21V 31/005* (2013.01); *H05B 3/16* (2013.01);
(Continued)

(58) Field of Classification Search

CPC ....... F21S 45/60; F21S 41/285; F21V 31/005; H05B 3/16; H05B 3/84; H05B 2203/013; H05B 2203/016; H05B 2214/02
See application file for complete search history.

(56) References Cited

U.S. PATENT DOCUMENTS 7,265,322 B2 * 9/2007 Aengenheyster ............................ B29C 45/14811 219/544
8,217,306 B2 7/2012 Inoue et al.
(Continued)

FOREIGN PATENT DOCUMENTS

EP 0788295 B1 9/2003
EP 2 264 360 A1 12/2010
JP 2007-305338 A 11/2007

OTHER PUBLICATIONS

English machine translation of JP 2007-305338 A dated Nov. 22, 2007, obtained from www.patdocs.com.
(Continued)

*Primary Examiner* — Peggy A Neils
(74) *Attorney, Agent, or Firm* — Woodard Emhardt Henry Reeves & Wagner

(57) ABSTRACT

A lamp or lens assembly for a motor vehicle that includes electrically conductive traces for defogging or deicing the lens. Aspects include a light transmissive lens coupled to a lamp housing. The light transmissive lens may define a curved cross-section with a curvature extending across the length and/or the width of the lens. The lens may include one or more electrically conductive traces positioned on a surface of the lens, the electrically conductive traces optionally extending across and curving with the curvature of the light transmissive lens. One or more coatings may optionally cover the conductive traces and a portion of the lens surface leaving portions uncovered. The electrically conductive
(Continued)

traces may extend outwardly away from the surface of the lens with height that is greater than their width.

21 Claims, 6 Drawing Sheets

(51) Int. Cl.
*F21V 31/00* (2006.01)
*H05B 3/16* (2006.01)
*H05B 3/84* (2006.01)

(52) U.S. Cl.
CPC ......... *H05B 3/84* (2013.01); *H05B 2203/013* (2013.01); *H05B 2203/016* (2013.01); *H05B 2214/02* (2013.01)

(56) References Cited

U.S. PATENT DOCUMENTS

| | | | | |
|---|---|---|---|---|
| 8,256,944 | B2 | 9/2012 | Yasuda | |
| 8,389,910 | B2 | 3/2013 | Bourke, III et al. | |
| 8,410,402 | B2 | 4/2013 | Burton | |
| 8,596,845 | B2 | 12/2013 | Burton et al. | |
| 8,618,443 | B2 | 12/2013 | Inoue et al. | |
| 8,899,803 | B2 | 12/2014 | Marley | |
| 8,967,842 | B2 | 3/2015 | Shah et al. | |
| 9,057,512 | B2 | 6/2015 | En et al. | |
| 9,333,904 | B2 | 5/2016 | Dross | |
| 9,518,714 | B2 | 12/2016 | Ah | |
| 9,578,718 | B2 | 2/2017 | Yokoyama et al. | |
| 9,994,195 | B2 | 6/2018 | Lesmeister et al. | |
| 10,364,954 | B2 | 7/2019 | Deering | |
| 10,716,172 | B2 * | 7/2020 | Weissenberger | H05B 3/84 |
| 11,255,508 | B2 * | 2/2022 | Ruan | F21S 41/28 |
| 2003/0029336 | A1 | 2/2003 | Thompson et al. | |
| 2006/0011596 | A1 | 1/2006 | Sharp et al. | |
| 2006/0245193 | A1 * | 11/2006 | Mochizuki | B29C 45/14639 362/253 |
| 2006/0278803 | A1 | 12/2006 | Mochizuki | |
| 2007/0151966 | A1 | 7/2007 | Schwenke et al. | |
| 2007/0181565 | A1 | 8/2007 | Murahashi et al. | |
| 2010/0006554 | A1 | 1/2010 | Inoue et al. | |
| 2011/0051447 | A1 * | 3/2011 | Lee | F21S 45/48 362/520 |
| 2011/0262627 | A1 | 10/2011 | Schwenke et al. | |
| 2013/0249375 | A1 | 9/2013 | Panagotacos et al. | |
| 2014/0332518 | A1 | 11/2014 | Lesmeister et al. | |
| 2015/0023037 | A1 | 1/2015 | Bauer et al. | |
| 2015/0055363 | A1 * | 2/2015 | Van Straten | B60Q 1/0017 362/520 |
| 2015/0078022 | A1 | 3/2015 | Bauer | |
| 2015/0252997 | A1 | 9/2015 | Hamid et al. | |
| 2015/0369445 | A1 | 12/2015 | Orr et al. | |
| 2016/0109088 | A1 * | 4/2016 | Orr | F21S 45/50 362/520 |
| 2016/0341390 | A1 | 11/2016 | Yamamura et al. | |
| 2016/0348869 | A1 | 12/2016 | Williams et al. | |
| 2016/0348870 | A1 | 12/2016 | Kim et al. | |
| 2016/0363286 | A1 | 12/2016 | Deering | |
| 2017/0234503 | A1 | 8/2017 | Buffone et al. | |
| 2018/0320854 | A1 * | 11/2018 | Salter | F21S 45/60 |
| 2019/0271450 | A1 | 9/2019 | Dallos et al. | |
| 2020/0300440 | A1 | 9/2020 | Monpremier | |

OTHER PUBLICATIONS

Jansson, De-icing and ice prevention of automotive headlamps and tail lamps, Stockholm 2014, Master of Science Thesis, KTH Industrial Eng. and Management.

* cited by examiner

DEICING SYSTEM FOR AN AUTOMOTIVE LAMP

CROSS-REFERENCE TO RELATED APPLICATION

This application is a continuation of U.S. patent application Ser. No. 16/901,203 filed Jun. 15, 2020, which is hereby incorporated by reference.

BACKGROUND

The present disclosure relates to lenses for lamp assemblies, for example, for automotive lamps such as head lamps, or perhaps tail lamps, turn signals, brake lamps, cargo lamps, and the like. These lamps may use incandescent or High Intensity Discharge (HID) lamps which generally create enough heat to reduce or eliminate fluid that may form on the lens such as in the case of condensation, rain, sleet, snow, ice, fog, and the like. Such a buildup of fluid may result in suboptimal light transmission and may degrade the performance of the lamp to a degree that renders it temporarily unusable, particularly in poor weather. This is especially concerning in the case of some types of Light Emitting Diode (LED) lamps where the lamp may not produce sufficient residual heat to effectively remove the fluid that may build up on the lens either in liquid or solid form, and especially in colder weather.

SUMMARY

Disclosed are examples of a lamp or lens assembly for a vehicle that include aspects for deicing the lens. In one example, the assembly may include a lamp positioned in a housing with a light transmissive lens coupled to the housing in front of the lamp. In another aspect, the light transmissive lens may define a curved cross-section with a curvature extending across the lens. In another aspect, lamp assembly may include one or more electrically conductive traces positioned on a surface of the lens, the electrically conductive traces optionally extending across and curving with the curvature of the light transmissive lens. In another aspect, the assembly may include a first coating covering the one or more electrically conductive traces, the first coating optionally covering a portion of the lens surface leaving a separate second portion uncovered. In another aspect, the electrically conductive traces optionally extend outwardly away from the surface of the lens and may have a thickness of at least 0.03 mm.

In another aspect, the electrically conductive traces are optionally positioned on an inside surface of the lens. In another aspect, the electrically conductive traces may have a cross-section that is taller than it is wide. In another aspect, the curvature of the light transmissive lens optionally defines a concave interior surface, and optionally a convex exterior surface. In another aspect, the electrically conductive traces may be positioned on the concave interior surface of the lens, on the convex exterior surface of the lens, or both.

In another aspect, the electrically conductive traces are optionally primarily made of conductive silver ink. In another aspect, the silver ink may be transparent, light transmissive, reflective, or opaque.

In another aspect, the assembly may include a second coating covering the first coating and the one or more electrically conductive traces, wherein the second coating may have a different chemical composition than the first coating, and wherein either the first or second coating (or both coatings) may include an anti-fog compound. In another aspect, the light transmissive lens optionally defines a curved surface area that is at least 65 square inches.

In another aspect, the light transmissive lens may be substantially round, and may define a curved cross-section that includes an arc extending outwardly from a center portion of the lens. In another aspect, the light transmissive lens may be about 4 to 4½ inches in diameter. In another aspect, the lens may be a headlight lens for a vehicle, that optionally defines an L-shaped cross-section and a corresponding corner region. The electrically conductive traces may extend across the corner region.

In another aspect, the assembly may include at least two electrically conductive terminals on the surface of the light transmissive lens. The at least two electrically conductive terminals are optionally electrically connected to the conductive traces. One of the electrically conductive terminals may be configured to receive power from a vehicle power source. In another aspect, another of the conductive terminals may be configured to receive an electrical connection to a ground circuit. In another aspect, the electrically conductive traces may have a resistance of less than 500 ohms.

In another example of the disclosed concepts, a lens assembly for a vehicle lamp is disclosed that may include a light transmissive lens that optionally defines a curved cross-section with a curvature that may extend across a length or a width of the lens. In another aspect, one or more electrically conductive traces may be positioned on an inside surface of the lens, the electrically conductive traces optionally extending across the curvature of the light transmissive lens. In another aspect, the curved cross-section optionally defines a concave inside surface of the lens. In another aspect, the electrically conductive traces may have a thickness of at least 0.03 mm. In another aspect, the electrically conductive traces may be primarily made of opaque conductive silver ink.

In another aspect, the lens assembly may include a first coating optionally covering at least a portion of the one or more electrically conductive traces and optionally covering a portion of the lens adjacent traces. In another aspect, a separate second portion of the lens may be free of the first coating.

In another aspect, the electrically conductive traces may have a cross-section that is taller than it is wide. In another aspect, the electrically conductive traces may extend outwardly away from the surface of the lens and have a thickness of at least 0.03 mm. in another aspect, the electrically conductive traces may be primarily made of conductive silver ink with a resistance of less than about 500 ohms. The disclosed silver ink may optionally be any one of be opaque, transparent, reflective, or translucent.

In another aspect, a second coating may cover some or all of the first coating and at least some portion of the one or more electrically conductive traces. In another aspect, the second coating may have a different chemical composition than the first coating. In another aspect, the second coating may include an anti-fog compound.

In another aspect, the light transmissive lens optionally defines a curved surface area that is at least 65 square inches. In another aspect, light transmissive lens may be substantially round and about 4 to 4½ inches in diameter. In another aspect, the assembly includes a housing coupled to the lens, and a lamp positioned in the housing adjacent the concave inside surface of the lens. In another aspect, the assembly may include a sealing member between the housing and the lens configured to partially or hermetically seal the housing to the lens with the lamp inside the housing.

Further forms, objects, features, aspects, benefits, advantages, and examples of the present disclosure will become apparent from the accompanying claims, detailed description, and drawings provided herewith.

DETAILED DESCRIPTION

Figure 1:
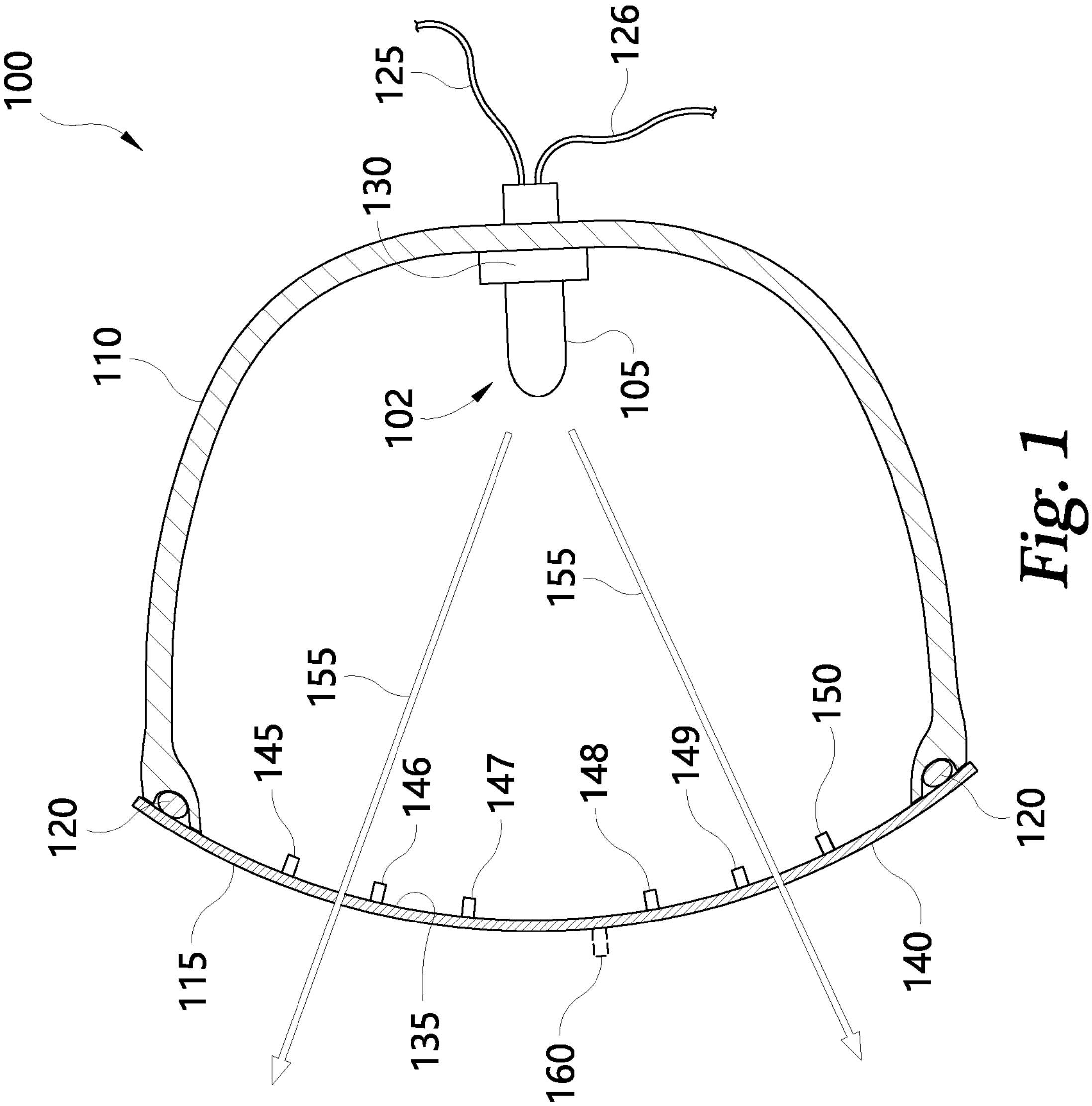
FIG. 1 is a cross-sectional view of one example of a head light assembly.

Illustrated at 100 is one example of a lamp assembly for a vehicle. As illustrated, a lamp 105 may be mounted to a housing 110, for example, with a light-emitting portion 102 inside the housing and held in place but if to the housing by a mount 130. The light-emitting portion 102 may be arranged and configured to generate and consequently transmit light rays 155, these light rays eventually passing outwardly away from lamp 105 and optionally through a light transmissive lens 115 mounted to front portion of housing 110. Housing 110 may be formed of any suitable material, and therefore may include metallic, nonmetallic, polymeric, or other such suitable materials which may be useful for retaining lamp 105 within housing 110 behind lens 115. Housing 110 may include reflective properties as well on its inside surface 112, and surface 112 may be shaped so as to focus or direct light rays 155 in any suitable way advantageous for the operation and use of lamp assembly 100.

In another aspect, the lamp assembly 100 may be arranged configured in any suitable position, such as on a vehicle, so that light rays 155 passing outwardly away from the lamp assembly 100 may be useful for providing illumination, warning, and the like. For example, lamp assembly 100 may be full as a headlamp for a vehicle such as a truck or a car, or in another aspect, lamp assembly 100 may be configured to operate as a turn signal lamp, or in other instances, as a tail lamp, brake lamp, rear illumination lamp, or cargo lamp for illuminating the cargo area of a trailer or truck, to name a few nonlimiting examples.

A power cable 125 may be electrically connected to a power source, such as a vehicle power circuit. In another aspect, a ground cable 126 may be electrically connected to a circuit ground, such as a frame or other circuit reference point of the vehicle, thus completing a power circuit providing power to lamp 105.

In another aspect, a sealing member 120 may be positioned between housing 110 and lens 115 to partially or fully seal the interior of housing 110 to reduce or eliminate the presence of contaminants or foreign object material such as moisture, dust, dirt, and the like. The sealing member 120 may comprise any suitable material such as rubber, polymeric material, and the like.

In another aspect, the lens 115 may define a curved cross-section with a curvature extending across the lamp 105. The lens 115 may also define an inside surface 135 which may be the portion of lens 115 that is inside housing 110 opposite, or across from, lamp 105. The lens 115 may also define an outside surface 140 which may be a surface outside housing 110. In another aspect, light rays 155 emitted by lamp 105 pass first through inside surface 135 and then through outside surface 140 as light leaves lamp assembly 100. Thus inside surface 135 may be defined as a first surface of lens 115 encountered by light rays 155 before the light rays exit lens 115 through a second surface such as outside surface 140. In another aspect, lens 115 may be formed from any suitable light transmissive material such as glass, or a polymeric material such as a polycarbonate compound. The light transmissive material may be clear or colored to transmit a particular color such as red, amber, and the like, or may include prisms, raised or recessed portions in various shapes or designs, or it may define other irregularities in the lens surface or cross-section which may be introduced to improve the intensity, focus, directionality, or other useful properties of light emitted by lamp assembly 100. In another aspect, lens 115 may be formed as a single unitary structure, or may be an aggregate of multiple separate structures retained together such as by an adhesive, ultraviolet or ultrasonic bonding, mechanical fasteners, or by other suitable means.

The lamp assembly 100 may include one or more conductive traces like conductive traces 145-150. These one or more electrically conductive traces may be positioned on any surface of the lens 115, such as on inside surface 135, and/or on outside surface 140. In another aspect, FIG. 1 illustrates an example of a light transmissive lens that defines a curved cross-section with a curvature extending across a length and/or width of the lens. In another aspect, lamp assembly 100 may be curved with the light transmissive lens defining a concave interior surface and/or a convex exterior surface, and the electrically conductive traces may optionally be positioned on the concave interior surface of the lens. The conductive traces 145-150 may be mounted adjacent the interior surface of the lens as illustrated to reduce or eliminate environmental effects on the traces, or, the conductive traces may optionally be mounted on the exterior outer surface of the lamp where such a mounting is advantageous (such as with trace 160). In another aspect, traces 145-150 may be mounted to or mounted adjacent lens 115.

In another aspect, the electrically conductive traces disclosed herein (such as traces 145-150 and others like them) may be primarily made of conductive silver ink. In another aspect, the disclosed electrically conductive traces, may extend outwardly away from the surface of the lens and have a thickness greater than 0.001 mm, greater than 0.01 mm, greater than 0.05 mm, or more. In another aspect, the electrically conductive traces disclosed herein may individually, or collectively as an overall circuit, may have a resistance of greater than 10 ohms, greater than hundred ohms, greater than 500 ohms, or greater than a thousand ohms or more. For example, the conductive traces 145-150 may be made primarily of conductive silver ink, have a resistance of less than 500 ohms, and may extend outwardly away from the surface of the lens at a thickness of at least 0.03 mm. Any suitable combination of thickness, resistance, and conductive material may be useful depending on various factors including the size of the light transmissive lens, the number of traces, and how the lamp is intended to be used, to name a few nonlimiting examples.

In another aspect, the electrically conductive traces disclosed herein may define any suitable cross-sectional shape such as in the case of traces 145-150 which define a rectangular cross-sectional shape. Other shapes may be useful such as squares, partial oval's, half circles, and the like. For example, traces 145-150 may be positioned on the light transmissive lens with a short edge of the rectangle closest to inside surface 135 of the light transmissive lens 115. By positioning the long axis of a rectangular electrically conductive trace generally parallel to light rays 155, the electrically conductive traces may thus advantageously minimize the light that is blocked by the presence of the conductive traces.

Figure 2:
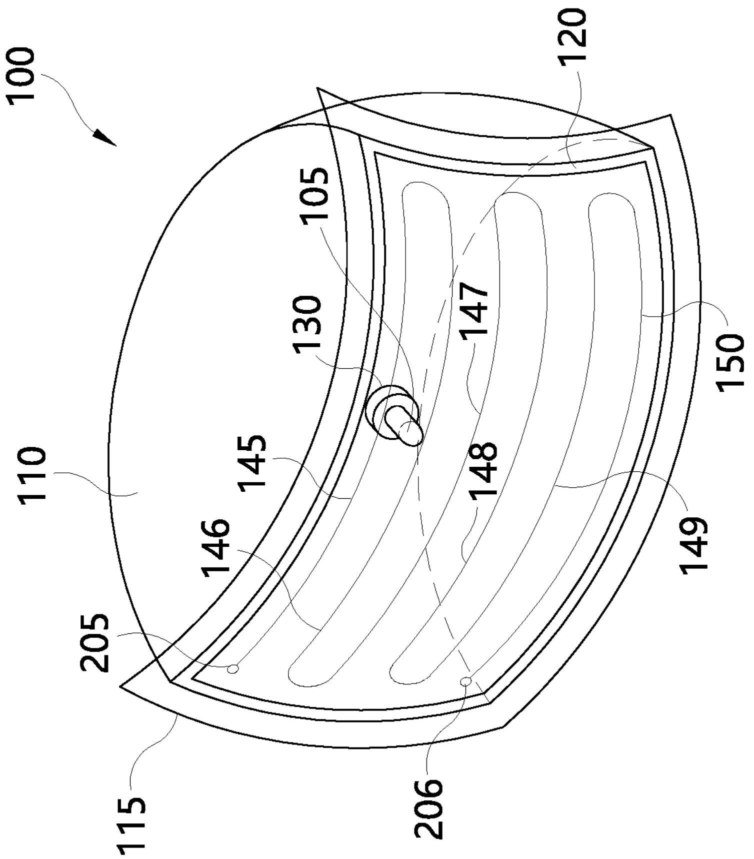
FIG. 2 is a perspective view of a head light assembly like the assembly of FIG. 1.

FIG. 2 illustrates other aspects of the lamp assembly 100 shown in FIG. 1. In one aspect, one or more electrically conductive traces 145-150 are positioned on a surface of the lens, the electrically conductive traces extending across and curving with the curvature of the lens. For example, the lens 115, curves across lamp assembly 100 in front of housing 110 with a concave shape defined by the length and/or width of lens 115. In another aspect, the lens may be planar across the length and/or the width of the lens.

In another aspect, conductive traces 145-150 may be electrically connected to one or more terminals 205 and 206. In this example, terminals 205 and 206 are electrically connected at opposite ends of the conductive circuit that includes traces 145-150. In another aspect, conductive traces mounted to the lens of lamp 100 may be thought of as separate traces 145-150, or as a single elongated trace rapping back and forth across lens 115. In either case, terminals 205 and 206 may be coupled electrically to power, and/or ground connections respectively thus creating a complete circuit through which electricity may flow from one terminal to the other so that electrically conductive traces 145-150 generate heat from the electric current. In this way, conductive traces mounted to lens 115 may be configured to generate heat adjacent one 15 to remove moisture such as fog, ice, and the like.

Figure 3:
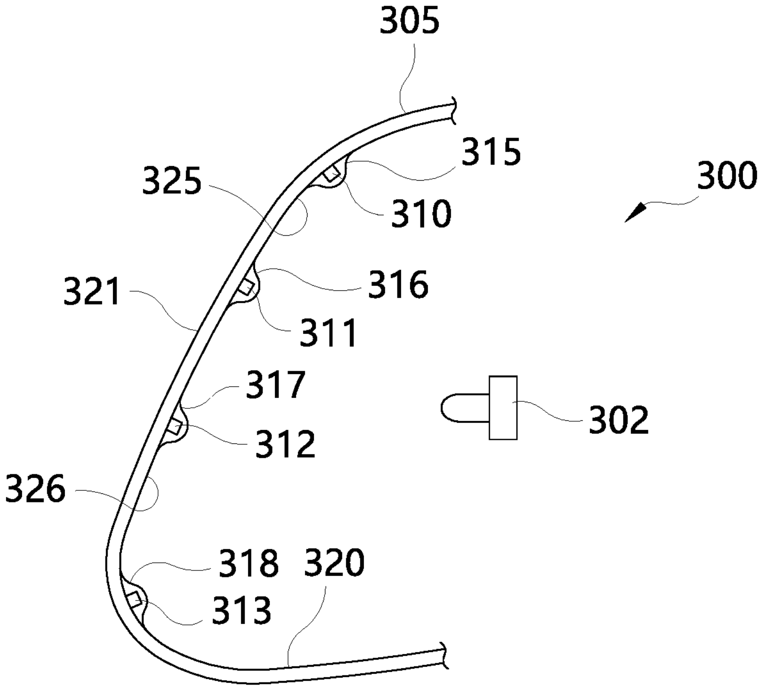
FIG. 3 is a cross-sectional view of another example of a head light assembly like those illustrated in the preceding figures.

Illustrated in FIG. 3, is a lens 300 illustrating aspects of an automotive headlamp lens that may also be included in any of the disclosed examples. A light transmissive lens 305 may be positioned in front of a lamp 302 such that the lamp 302 may project light rays outwardly toward an inside surface 320, the light rays passing through an outside surface 321 before leaving light transmissive lens 305 altogether. In this respect, inside surface 320 may be thought of as the surface of light transmissive lens 305 closest to lamp 302 and/or the first surface encountered by light rays from lamp 302.

In another aspect, conductive traces 310, 311, 312, and 313 may be positioned adjacent the inside surface 320 (or alternatively, outside surface 321) of the light transmissive lens. The conductive traces may, for example, be in direct contact with the surface of the lens, although direct contact is not required for heat to transfer from the conductive traces 310-313 to light transmissive lens 305.

In another aspect, one or more coatings may be applied to partially or fully cover the conductive traces mounted on the lens. These coatings may be transparent, semi-transparent, tinted, or may include other advantageous properties. For example, the one or more coatings covering the conductive traces may include a chemical compound useful for reducing or eliminating the formation of fog or other moisture buildup on the lens.

For example, a first coating 315 may partially or completely cover a first conductive trace such as conductive trace 310, and a coating 316 may partially or completely cover a second conductive trace such as conductive trace 311. The coating 315 may also cover a portion of light transmissive lens 305, leaving and uncoated region 326 between coating 315 and coating 316. Similarly, a coating 317 may partially or fully cover a conductive trace 312, and a coating 318 may coat a conductive trace 313 leaving and uncoated region 325 on the inside surface 320. In another aspect, portions of inside surface 320 of light transmissive lens 305 may be coated with a coating such as an anti-fog coating, while other portions may not be coated. Thus a first coating may cover the one or more electrically conductive traces, and the first coating may cover a portion of the lens surface leaving a separate second portion uncovered.

In another aspect, lens 300 may be curved with the light transmissive lens defining a concave interior surface and a convex exterior surface, and the electrically conductive traces may optionally be positioned on the concave interior surface of the lens, on the convex exterior surface, or both. The disclosed coatings 315-318 may therefore be positioned on the exterior surface of the lens, on the interior surface of the lens, or both.

Figure 4:
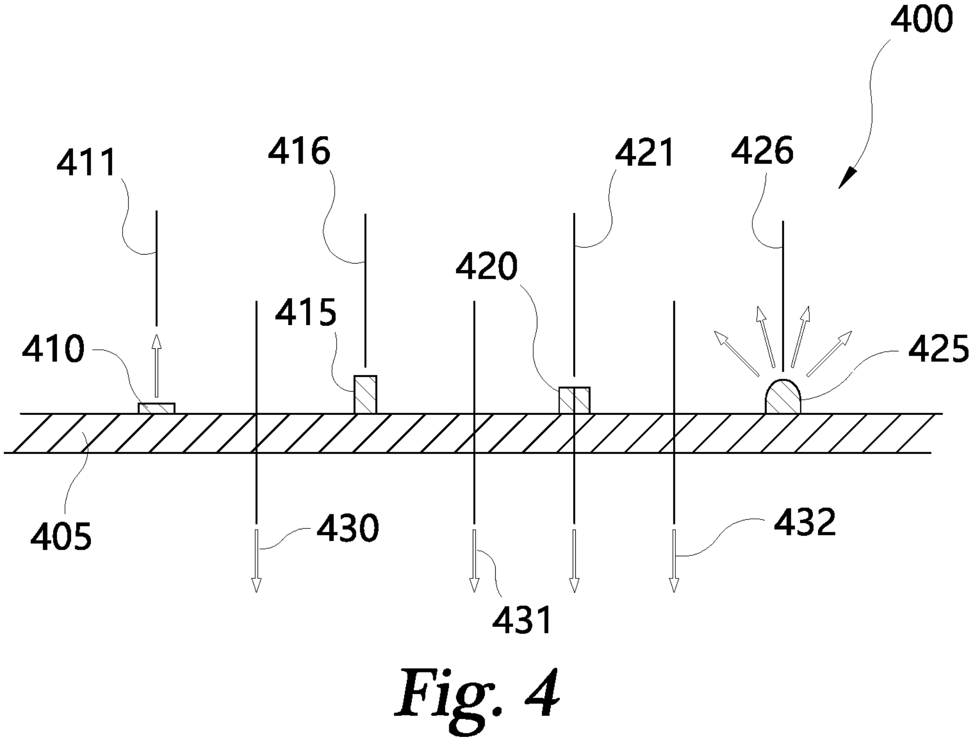
FIG. 4 is a cross-sectional view illustrating different types of conductive traces useful in light assemblies like those shown in the preceding figures.

FIG. 4 illustrates other aspects of conductive traces mounted to a light transmissive lens that may be useful in any of the disclosed examples of a vehicle lamp. Examples of conductive traces 400 are shown mounted adjacent, or directly to, a light transmissive lens 405 like other such light transmissive lenses disclosed herein elsewhere. In one example, a conductive trace 410 may be arranged and configured adjacent to light transmissive lens 405 with a cross-section that is wider than it is tall, that is, rectangular, and having the long side of the rectangle adjacent light transmissive lens 405. In this example, conductive trace 410 may be optically reflective reflecting light rays 411 coming towards conductive trace 410, such as from a lamp mounted behind light transmissive lens 405. In this example, light rays 411 may be reflected directly back towards the lamp in a direction opposite, or nearly opposite, to the original path traveled toward conductive trace 410. In another aspect, light rays 430-432 pass-through light transmissive lens 405 unobstructed by any of the disclosed conductive traces.

In another aspect, the disclosed conductive traces may include a rectangular cross-section such as conductive trace 415 where the short side of the rectangle is adjacent light transmissive lens 405 thus forming a trace that is taller than it is wide. In this example, trace conductive trace 415 may stand taller away from light transmissive lens 405 and project towards the light source which may allow for a conductive trace that has a similar volume as trace like trace 410 volume and is thus able to generate a similar amount of heat when powered, while obstructing fewer light rays 416 then would be obstructed by a trace like trace 410, or 420. Thus it may be advantageous to have traces on a light transmissive lens that are taller than they are wide thus standing further away from the lens surface but with a narrower cross-section. In another aspect, conductive traces as disclosed herein may be opaque or light absorbing like conductive trace 415 rather than light reflecting like trace 410. This property may be advantageous for capturing any available energy (however small) that is transmitted by light rays 416 to aid in the heating process.

In another aspect, conductive traces as disclosed herein may include a square cross-section with a height and width that is approximately equal like what is shown at conductive trace 420. In another aspect, conductive traces as discussed herein may be like conductive trace 420 with a partially or fully transparent property so that light rays such as light rays 421 may pass through the conductive trace with little to no obstruction, reflection, or absorption.

In another example, the conductive traces discussed herein may be of other shapes such as an oval, semi-oval, half circle, and the like, similar to conductive trace 425. Light rays 426 may be reflected in multiple directions from conductive trace 425 effectively scattering the reflected light, or in another example, light may be absorbed rather than scattered.

In another aspect, the lens in FIG. 4 may be concave with a concave inner surface and a convex outer surface, or planer with substantially parallel inner and outer surfaces. As disclosed herein elsewhere, the conductive traces may be advantageously positioned on either the inner or outer surface of the lens, or on both surfaces.

Another example of a light transmissive lens with properties that may be included in any of the illustrated examples disclosed herein is shown at 500. In one aspect, conductive traces 510-514 may be mounted adjacent to a light transmissive lens 505. In another aspect, the disclosed conductive traces may be covered with multiple coatings with different properties. For example, conductive trace 510 may be partially or completely covered with first coating 515 optionally covering a portion of light transmissive lens 505. In another aspect, first coating 515 may optionally leave uncoated portions between coating 515 and 516, where the first coating over traces 510, and 511 optionally does not extend completely across the inside surface of lens 505. In another aspect, a second coating 520 may cover conductive trace 510, conductive trace 511, and possibly other conductive traces as well. Either the first or second coating, or both, may include chemical properties reducing or eliminating buildup of fog, droplets, or other obstructions on an inside surface of the lens. In another aspect, the first or the second coating may also be applied to adhere or otherwise retain conductive traces adjacent, or directly, to the light transmissive lens. This may also advantageously increase the heat transfer properties of the conductive traces to further reduce reduce or eliminate fog, droplets, or ice buildup on either the inside or outside of the lens.

In another aspect, the lens at lens 500 may be concave with a concave inner surface and a convex outer surface. The conductive traces in the disclosed first and second coatings may be advantageously positioned on the concave interior surface of the lens, or optionally, on the outside convex surface of the lens, or both.

Figure 6:
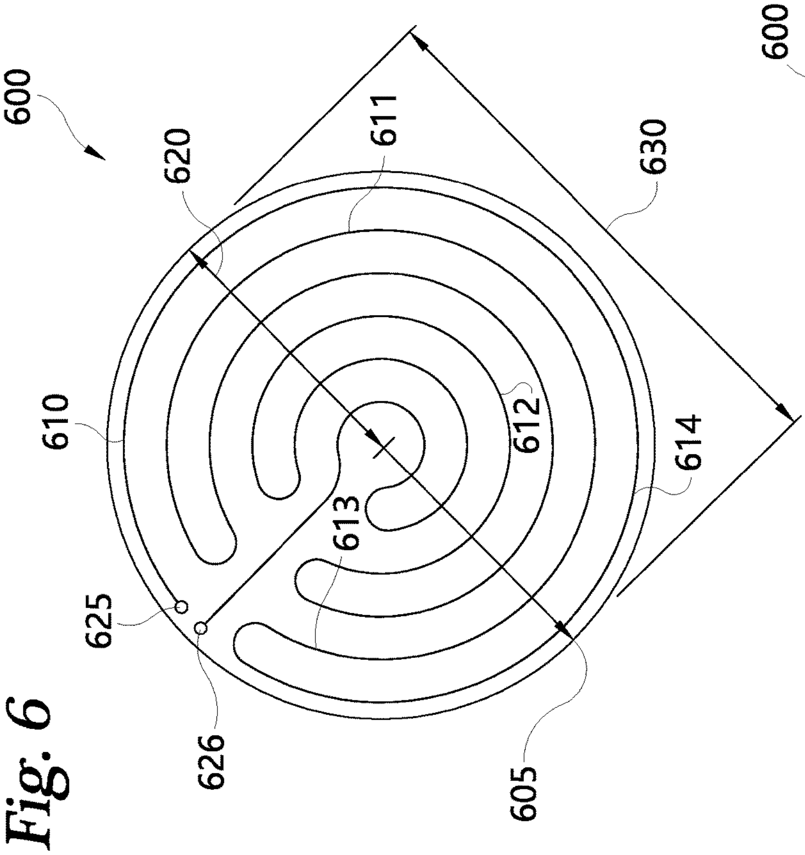
FIG. 6 is a front view of a light transmissive lens for a light assembly that is like those shown in the preceding figures.
Figure 7:
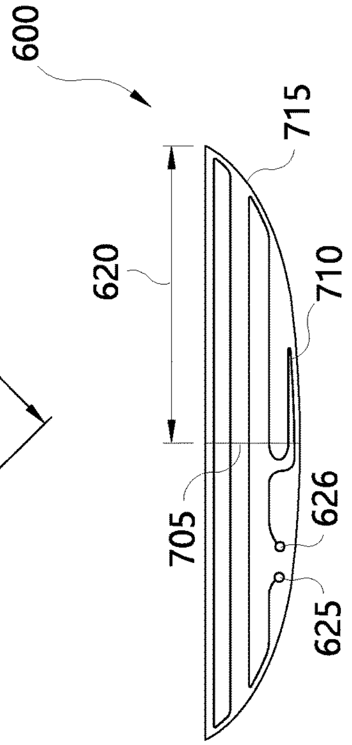
FIG. 7 is a cross-sectional view of the lens shown in FIG. 6.
Figure 5:
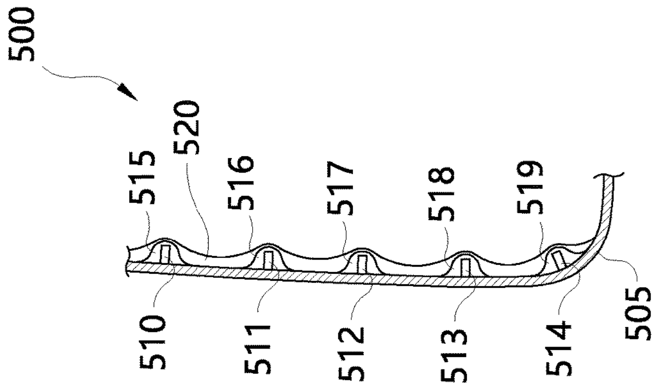
FIG. 5 is a cross-sectional view of one example of a light transmissive lens with conductive traces that is like those shown in the preceding figures.

Another example of a lens 600 is illustrated in FIGS. 6 and 7. In this example, lens 600 is generally circular in shape having a radius 620 and a diameter 605. Multiple conductive traces 610-614 may be included in mounted adjacent to lens 600 either on an inside surface or outside surface of the lens. As in the other examples disclosed herein, conductive traces 610-614 may also be thought of as a single conductive trace that winds its way around lens 600 in any suitable manner, only one of which is illustrated, such arrangement being illustrative rather than restrictive. A terminal 625 and terminal 626 may be included for connecting to power and ground connections which may apply electrical current through the conductive trace(s). Such conductive current may cause heating in the traces thus raising the temperature of lens 600 to reduce or eliminate fluid buildup either on the interior or exterior surface of the lens.

As illustrated in FIG. 7, lens 600 may have a curved cross-section such that the lens defines an arc 715 with an outside surface 710. With an arcuate cross-section, lens 600 may also define a depth 705 giving the lens a depth as well as an approximately equal length and width according to the generally circular shape of the lens. In another aspect, the lens diameter 605 (which here corresponds to with 630) may be less than or equal to 2 inches, greater than 2 inches, greater than 4 inches, greater than 6 inches, or more. In another aspect, lenses disclosed herein which may be round, rectangular, L-shaped, or any other suitable shape, may define surface area that is less than or equal to 40 square inches, greater than 40 square inches, greater than 60 square inches, greater than 100 square inches, or more. For example, lens 600 may be about 4 to 4½ inches in diameter with a surface area of 65 square inches, or more.

Figure 8:
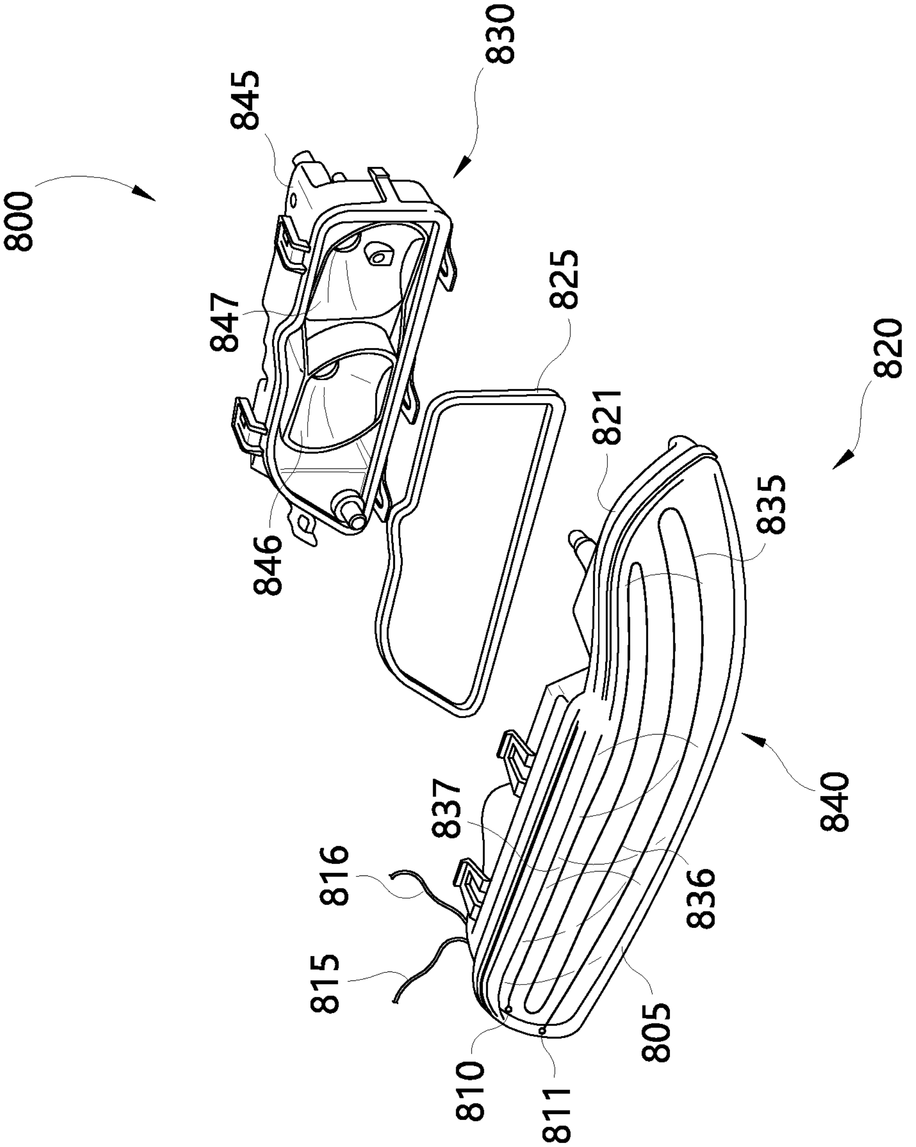
FIG. 8 is a front exploded view of a head light assembly like those shown in the preceding figures.
Figure 9:
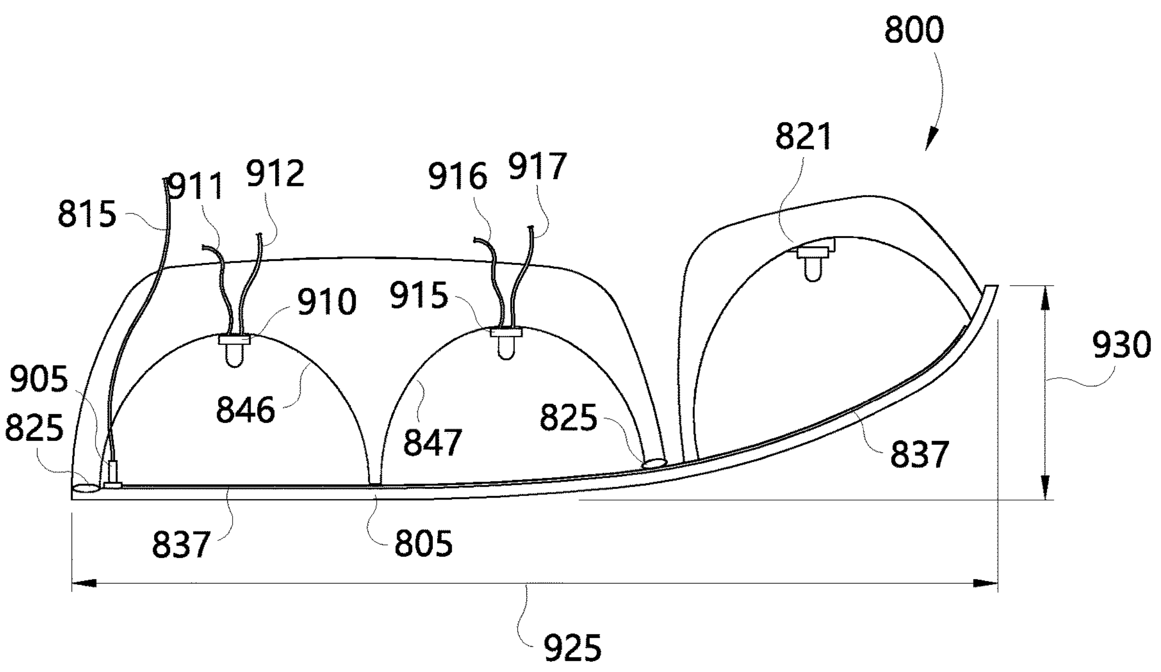
FIG. 9 is a top cross-sectional view of the head light assembly of FIG. 8.
Figure 10:
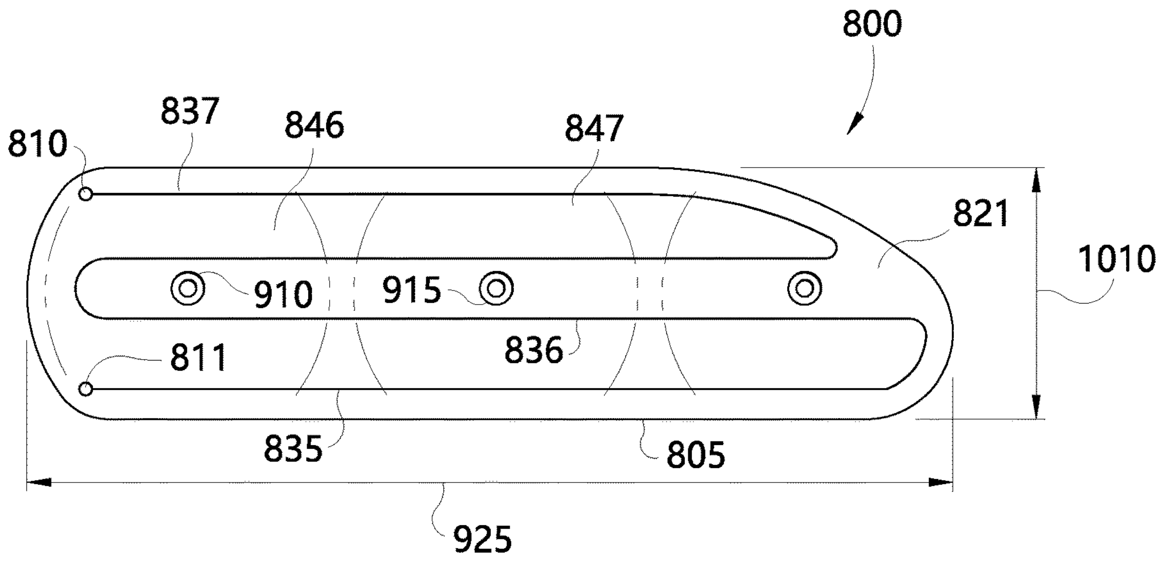
FIG. 10 is a front view of the head light assembly of FIGS. 8 and 9.

Another example of a lamp assembly 800 is illustrated in FIGS. 8, 9 and 10. A lamp assembly 800 optionally includes a lens assembly 820, a sealing member 825, and a lamp mounting assembly 830, all of which may be configured to couple together by any suitable means. The lens assembly 820 may include a light transmissive lens 805 according to any of the examples illustrated herein and described elsewhere. A terminal 810 and terminal 811 may also be included and configured to electrically connect to power cable 815 and ground cable 816 respectively in order to complete electric circuit with conductive traces such as 835-837. lens assembly 820 optionally includes a turn signal lamp mount 821 that may include a turn signal bulb or other such lamps.

In another aspect, lens assembly 820 may also be curved, such as in a general L-shape, thus defining a corner region 840 where the lamp bends around at nearly right angles to accommodate the corner shape of the vehicle. Such an L-shape is optional, as some headlamp assemblies like the one disclosed may not include this configuration corner configuration.

In another aspect illustrated in FIG. 9, lamp assembly 800 may include an optional lamp mounting assembly 830 having an optional lamp mount 845 that may include one or more reflectors 846 and 847. In another aspect, lamps 910 and 915 like those disclosed herein elsewhere, may be mounted at the rear portion of the reflector 846 and reflector 847 individually. Lamps 910 and 915 may be electrically connect to power via power and ground cables 911, 912, 916, and 917. The reflector 846 and reflector 847 may be advantageously shaped and configured to direct light rays from lamps mounted at the rear portion of the reflector to focus and direct light passing through lens assembly 820 and light transmissive lens 805 in particular.

Aspect, lamp assembly 800 may include a power terminal 905 configured to receive power from power cable 815 and two electrically connect with terminal 810 of the lens 805 thus providing power to traces mounted to light transmissive lens 805. In another aspect illustrated in FIG. 10, traces 835-837 may extend across a length 925 of the lens 805, and across its depth 930 as the traces wrap around the corner region 840 and onto the corner portion of the L-shaped lens. In another aspect, traces 835-837 may extend across a width 1010 of the lens.

The concepts illustrated and disclosed herein related to a lamp assembly may be configured according to any of the following non-limiting numbered examples:

Example 1

A lamp assembly for a vehicle, comprising a lamp positioned in a housing; a light transmissive lens coupled to the housing in front of the lamp, the light transmissive lens defining a curved cross-section with a curvature extending across the lens; and one or more electrically conductive traces positioned on a surface of the lens, the electrically conductive traces extending across and curving with the curvature of the light transmissive lens.

Example 2

The lamp assembly of any preceding example, comprising a first coating covering the one or more electrically conductive traces Example 3

The lamp assembly of any preceding example, wherein the first coating covers a portion of the lens surface leaving a separate second portion uncovered.

Example 4

The lamp assembly of any preceding example, wherein the electrically conductive traces extend outwardly away from the surface of the lens and have a thickness of at least 0.03 mm.

Example 5

The lamp assembly of any preceding example, wherein the electrically conductive traces are positioned on an inside surface of the lens.

Example 6

The lamp assembly of any preceding example, wherein the electrically conductive traces are positioned on an outside surface of the lens.

Example 7

The lamp assembly of any preceding example, wherein the electrically conductive traces have a cross-section that is taller than it is wide.

Example 8

The lamp assembly of any preceding example, wherein the electrically conductive traces have a cross-section that is about as tall as it is wide.

Example 9

The lamp assembly of any preceding example, wherein the electrically conductive traces have a cross-section that is wider than it is tall.

Example 10

The lamp assembly of any preceding example, wherein the electrically conductive traces have a cross-section that defines a half circle, or a half oval.

Example 11

The lamp assembly of any preceding example, wherein the curvature of the light transmissive lens defines a concave interior surface, and wherein the electrically conductive traces are positioned on the concave interior surface of the lens.

Example 12

The lamp assembly of any preceding example, wherein the curvature of the light transmissive lens defines a convex exterior surface, and wherein the electrically conductive traces are positioned on the convex exterior surface of the lens.

Example 13

The lamp assembly of any preceding example, wherein the curvature of the light transmissive lens defines a substantially planar inner or outer surface, and wherein the electrically conductive traces are positioned on the planar surface of the lens.

Example 14

The lamp assembly of any preceding example, wherein the electrically conductive traces are primarily made of conductive silver ink.

Example 15

The lamp assembly of any preceding example, wherein the electrically conductive traces are substantially opaque.

Example 16

The lamp assembly of any preceding example, wherein the electrically conductive traces are substantially opaque.

Example 17

The lamp assembly of any preceding example, wherein the ink is translucent, substantially transparent, and/or light transmissive.

Example 18

The lamp assembly of any preceding example, comprising a second coating covering a first coating and the one or more electrically conductive traces.

Example 19

The lamp assembly of any preceding example, wherein a second coating has a different chemical composition than a first coating, and wherein the first or second coating, or both, include an anti-fog compound.

Example 20

The lamp assembly of any preceding example, wherein the light transmissive lens defines a surface area that is at least 65 square inches.

Example 21

The lamp assembly of any preceding example, wherein the light transmissive lens is substantially round, and wherein the curved cross-section defines an arc extending outwardly from a center of the lens.

Example 22

The lamp assembly of any preceding example, wherein the light transmissive lens is about 4 to 4½ inches in diameter.

Example 23

The lamp assembly of any preceding example, wherein the lens defines an L-shaped cross-section and a corresponding corner region, the electrically conductive traces extending across the corner region.

Example 23

The lamp assembly of any preceding example, comprising at least two electrically conductive terminals on the surface of the light transmissive lens, wherein the at least two electrically conductive terminals are electrically connected to the conductive traces; and wherein one of the electrically conductive terminals is configured to receive power from a vehicle power source.

Example 24

The lamp assembly of any preceding example, wherein the lamp includes at least one light emitting diode.

Example 25

The lamp assembly of any preceding example, wherein the lens is a headlight lens for a vehicle.

Example 26

The lamp assembly of any preceding example, wherein the electrically conductive traces have a resistance of less than 500 ohms.

The concepts illustrated and disclosed herein related to a lens assembly may be configured according to any of the following non-limiting numbered examples:

Example 1

A lens assembly for a vehicle lamp that includes a light transmissive lens that defines a curved cross-section with a curvature extending across a length or a width of the lens, and one or more electrically conductive traces on an inside surface of the lens, the electrically conductive traces extending across the curvature of the light transmissive lens.

Example 2

The lens assembly of any preceding example, wherein the curved cross-section defines a concave inside surface of the lens.

Example 3

The lens assembly of any preceding example, wherein the electrically conductive traces have a thickness of at least 0.03 mm.

Example 4

The lens assembly of any preceding example, wherein the electrically conductive traces are primarily made of conductive silver ink.

Example 5

The lens assembly of any preceding example, comprising a first coating covering at least a portion of the one or more electrically conductive traces and a portion of the lens adjacent, wherein a separate second portion of the lens is free of the first coating.

Example 6

The lens assembly of any preceding example, wherein the electrically conductive traces extend outwardly away from the surface of the lens and have a thickness of at least 0.03 mm.

Example 7

The lens assembly of any preceding example, wherein the electrically conductive traces are positioned on an inside surface of the lens.

Example 8

The lens assembly of any preceding example, wherein the electrically conductive traces are positioned on an outside surface of the lens.

Example 9

The lens assembly of any preceding example, wherein the electrically conductive traces have a cross-section that is taller than it is wide.

Example 10

The lens assembly of any preceding example, wherein the electrically conductive traces have a cross-section that is about as tall as it is wide.

Example 11

The lens assembly of any preceding example, wherein the electrically conductive traces have a cross-section that is wider than it is tall.

Example 12

The lens assembly of any preceding example, wherein the electrically conductive traces have a cross-section that defines a half circle, or a half oval.

Example 13

The lens assembly of any preceding example, comprising a second coating covering a first coating and the one or more electrically conductive traces, wherein the second coating has a different chemical composition than the first coating, and wherein the second coating includes an anti-fog compound.

Example 14

The lens assembly of any preceding example, wherein the light transmissive lens defines a curved surface area that is at least 65 square inches in area.

Example 15

The lens assembly of any preceding example, wherein the light transmissive lens is substantially round and about 4 to 4½ inches in diameter.

Example 16

The lens assembly of any preceding example, comprising a housing coupled to the lens, a lamp positioned in the housing adjacent a concave inside surface of the lens, and a sealing member between the housing and the lens configured to partially or hermetically seal the housing to the lens with the lamp inside the housing.

Example 17

The lens assembly of any preceding example, wherein the lamp includes at least one light emitting diode.

Example 18

The lens assembly of any preceding example, wherein the lens is a headlight lens for a vehicle.

Example 23

The lens assembly of any preceding example, wherein the electrically conductive traces have a resistance of less than 500 ohms.

Glossary of Terms and Alternative Wordings

While examples of the inventions are illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the inventions. No limitation of the scope of the inventions is thereby intended. Any alterations and further modifications in the described examples, and any further applications of the principles described herein are contemplated as would normally occur to one skilled in the art to which the inventions relate. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example if the stated value is 4.375, then use of the term "about 4.375" generally means a range between 3.9375 and 4.8125.

"Activate" generally is synonymous with "providing power to", or refers to "enabling a specific function" of a circuit or electronic device that already has power.

"And/or" is inclusive here, meaning "and" as well as "or". For example, "P and/or Q" encompasses, P, Q, and P with Q; and, such "P and/or Q" may include other elements as well.

"Cable" generally refers to one or more elongate strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongate strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used. A cable may include a sheath or layer surrounding the cable with electrically non-conductive material to electrically insulate the cable from inadvertently electrically connecting with other conductive material adjacent the cable. A cable may include multiple individual component cables, wires, or strands, each with, or without, a nonconductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Coating" generally refers to a covering that is applied to the surface of an object, the object sometimes referred to as the substrate. The purpose of applying the coating may be decorative, functional, or both. A single coating may provide one purpose such as to be functional in one area of the coating, and to provided decoration in another area. The coating may completely cover the substrate, or it may only cover parts of the substrate thus defining interstices, openings, or voids in the coating. Coatings are sometimes applied to a material repeatedly thus creating multiple coatings on top one another.

"Contact" means here a condition or state where at least two objects are physically touching. As used, contact requires at least one location where objects are directly or indirectly touching, with or without any other member(s) material in between.

"Convex" generally refers to a line or surface that curves away from a reference point. Such a surface may also be said to curve "outwardly" away from the reference point.

"Concave" generally refers to a line or surface that curves toward a reference point. Such a surface may also be said to curve "inwardly" toward the reference point.

"Cross-sectional Area" generally refers to generally refers to the area of a non-empty intersection of a solid body in three-dimensional space with a plane. The shape of the cross-section of a solid may depend upon the orientation of the cutting plane to the solid. For example, while all the cross-sections of a ball are disks of varying diameters, the cross-sections of a cube depend on how the cutting plane is related to the cube. If the cutting plane is perpendicular to a line joining the centers of two opposite faces of the cube, the cross-section will be a square, however, if the cutting plane is perpendicular to a diagonal of the cube joining opposite vertices, the cross-section can be either a point, a triangle or a hexagon. A cross-section of a solid right circular cylinder extending between two bases is a disk if the cross-section is parallel to the cylinder's base, or an elliptic region if it is neither parallel nor perpendicular to the base. If the cutting plane is perpendicular to the base it consists of a rectangle unless it is just tangent to the cylinder, in which case it is a single line segment.

"Electrically Connected" generally refers to a configuration of two objects that allows electricity to flow between them or through them. In one example, two conductive materials are physically adjacent one another and are sufficiently close together so that electricity can pass between them. In another example, two conductive materials are in physical contact allowing electricity to flow between them.

"Ground" or "circuit ground" generally refers to a node in an electrical circuit that is designated as a reference node for other nodes in a circuit. It is a reference point in an electrical circuit from which voltages are measured, a common return path for electric current, and/or a direct physical connection to the Earth.

"Lamp" generally refers to an electrical device configured to produce light using electrical power. The generated light may be in the visible range, ultraviolet, infrared, or other light. Example illumination technologies that may be employed in a lamp include, but are not limited to, incandescent, halogen, LED, fluorescent, carbon arc, xenon arc, metal-hallide, mercury-vapor, sulfer, neon, sodium-vapor, or others.

"LED Lamp" generally refers to an electrical device that uses Light Emitting Diodes (LEDs) to produce light using electrical power. A lamp may include a single LED, or multiple LEDs.

"Trace" generally refers to an electrical conductor physically coupling and electrically connecting two other electrical conductors. Examples of a traces include electrical connections between components on a Printed Circuit Board (PCB), or wires electrically connecting to portions of an electrical circuit. A bundle of wires electrically connecting multiple circuits together may be thought of as a single trace or lead, or as multiple separate traces or leads.

"Light Emitting Diode" or "LED" generally refers to a diode that is configured to emit light when electrical power passes through it. The term may be used to refer to single diodes as well as arrays of LED's and/or grouped light emitting diodes. This can include the die and/or the LED film or other laminate, LED packages, said packages may include encapsulating material around a die, and the material, typically transparent, may or may not have color tinting and/or may or may not have a colored sub-cover. An LED can be a variety of colors, shapes, sizes and designs, including with or without heat sinking, lenses, or reflectors, built into the package.

"Light Transmissive" means permitting light to pass through it, such as being transparent, translucent, with or without tint, lenses, ridges and/or prisms.

"Metallic" generally refers to a material that includes a metal, or is predominately (50% or more by weight) a metal. A metallic substance may be a single pure metal, an alloy of two or more metals, or any other suitable combination of metals. The term may be used to refer to materials that include nonmetallic substances. For example, a metallic cable may include one or more strands of wire that are predominately copper sheathed in a polymer or other non-conductive material.

"Multiple" as used herein is synonymous with the term "plurality" and refers to more than one, or by extension, two or more.

"Opaque" generally refers to a property of a substance whereby the substance substantially blocks the passage of radiant energy such as light, or other electromagnetic energy.

"Optionally" as used herein means discretionary; not required; possible, but not compulsory; left to personal choice.

"Polymeric Material" or "Polymer" generally refers to naturally occurring and synthetic materials characterized by a molecular structure formed from the repetition of subunits bonded together. Examples include, but are not limited to, naturally occurring substances such as amber, silk, hemp, and many kinds of synthetic substances such polyethylene, polypropylene, polystyrene, polyvinyl chloride, synthetic rubber, phenol formaldehyde resin (or Bakelite), neoprene, nylon, polyacrylonitrile, silicone, and the like.

"Power Connector" generally refers to devices or assemblies that allow electrical power to be selectively applied from one circuit to another. Examples include mechanical plugs and sockets or other similar devices that allow an electrical connection to be made between to circuits. A power connector may be configured with multiple pins, terminals, or other contact points to connect multiple cables or circuits together within the same physical connector. Examples include, but are not limited to, industrial and multiphase plugs and sockets, power plugs and receptacles that comply with the National Electrical Manufacturers Association (NEMA) for providing AC power, cylindrical or coaxial power connectors commonly used to carry DC power, snap and lock DC power connectors, Molex connectors, Tamiya connectors commonly used on radio-control vehicle battery packs and chargers, Anderson Powerpole connectors, Society of Automotive Engineers (SAE) connector which is a hermaphrodite two-conductor DC connector commonly used for solar and automotive applications, Universal Serial Bus (USB) connectors and sockets, as well as 4, 5, 6, and 7-way (or more) trailer wiring connectors and sockets that are used to selectively supply power from a towing vehicle to a trailer.

"Predominately" as used herein is synonymous with greater than 50%.

"Terminal" generally refers to a plug, socket or other connection (male, female, mixed, hermaphroditic, or otherwise) for mechanically and electrically connecting two or more wires or other conductors.

"Transparent" generally refers to a property of a substance whereby the substance allos the substantially unobstructed transmission of radiant energy such as light or other electromagnetic energy, without appreciable obstruction or scattering. For example, transparent substances allow for light transmission to an extent that objects can be clearly seen through the substance with little or loss of clarity.

"Turn Signal Lamp" generally refers to lamps positioned on a vehicle or trailer to warn of a change in the direction of travel when activated. Sometimes referred to as "direction indicators" or "directional signals", or as "directionals", "blinkers", "indicators" or "flashers"—turn signal lam blinking lamps mounted near the left and right front and rear corners of a vehicle or trailer. As used herein, the term generally refers to a turn signal lamp which is compliant with present legal and/or regulatory requirements for a truck or a trailer such as illuminated surface area, candela, and otherwise. Such regulations include, for example, Title 49 of the U.S. Code of Federal Regulations, section 571.108, also known as Federal Motor Vehicle Safety Standard (FMVSS) 108

"Unitary Molded Structure" generally refers to a structure formed as a single or uniform entity.

"Vehicle" generally refers to a self-propelled or towed device for transportation, including without limitation, car, truck, bus, boat, tank or other military vehicle, airplane, truck trailer, truck cab, boat trailer, other trailer, emergency vehicle, and motorcycle.

REFERENCE NUMBERS

100 lamp assembly
102 light emitting portion
105 lamp
110 housing
112 inside surface
115 lens
120 sealing member
125 power cable
126 ground cable
130 mount
135 inside surface
140 outside surface
145 conductive trace
146 conductive trace
147 conductive trace
148 conductive trace
149 conductive trace
150 conductive trace
155 light rays
160 optional conductive trace
205 terminal
206 terminal
300 lens
302 lamp
305 light transmissive lens
310 conductive trace
311 conductive trace
312 conductive trace
313 conductive trace
315 coating
316 coating
317 coating
318 coating
320 inside surface
321 outside surface
325 uncoated region
326 uncoated region
400 conductive traces
405 light transmissive lens
410 conductive trace
411 light rays
415 conductive trace
416 light rays
420 conductive trace
421 light rays
425 conductive trace
426 light rays
430 light rays
431 light rays
436 light rays
500 lens
505 light transmissive lens
510 conductive trace
511 conductive trace
512 conductive trace
513 conductive trace
514 conductive trace
515 first coating
516 first coating
517 first coating
518 first coating
519 first coating
520 second coating
600 lens
605 diameter
610 conductive trace
611 conductive trace
612 conductive trace
613 conductive trace
614 conductive trace
620 radius
625 terminal
626 terminal
630 width
705 depth
710 outside surface
715 arc
800 lamp assembly
805 light transmissive lens
810 terminal
811 terminal
815 power cable
816 ground cable
820 lens assembly 821 turn signal lamp mount
825 sealing member
830 lamp mounting assembly
835 conductive trace
836 conductive trace
837 conductive trace
840 corner region
845 lamp mount
846 reflector
847 reflector
905 power terminal
910 lamp
911 power cable
912 ground cable
915 lamp
916 power cable
917 ground cable
918 power cable
919 ground cable
925 length
930 depth
1010 width

What is claimed is:

1. A lens assembly for a vehicle lamp, comprising:

a light transmissive lens that defines a curved cross-section, and wherein the lens defines a concave inside surface of the lens;

a housing coupled to the lens, the lens and housing defining an interior void of the lens assembly;

a metallic trace on an inside surface of the lens, the trace extending away from the lens and into the interior void such that a portion of the metallic trace is uncovered and exposed to the void, the trace defining a serpentine path having one or more elongate parallel runs, and one or more reversing turns interspersed between the elongate parallel runs, wherein the trace is electrically conductive; and a first terminal electrically connected to a first end of the trace, and a second terminal electrically connected to a second end of the trace, wherein the first and second terminals are operable to receive electrical power from the vehicle, and wherein the trace is operable to generate heat upon receiving the electrical power via the first and second terminals.

2. The lens assembly of claim 1, wherein the electrically conductive traces are positioned on an inside surface of the light transmissive lens.

3. The lens assembly of claim 1, wherein the lens defines a convex outside surface.

4. The lens assembly of claim 1, wherein the inside and outside surfaces of the lens are substantially parallel.

5. The lens assembly of claim 1, wherein the elongate runs include two or more runs that are substantially parallel to one another on the surface of the lens.

6. The lens assembly of claim 1, wherein the elongate runs include two or more runs that extend across at least 50% of the light transmissive lens.

7. The lens assembly of claim 1, wherein the elongate runs are arranged substantially parallel to upper and lower edges of the lens.

8. The lens assembly of claim 1, wherein the elongate runs include two or more runs that wrap around the surface of the light transmissive lens.

9. The lens assembly of claim 1, wherein the lens defines an L-shaped cross-section with a corresponding corner region, and wherein the serpentine path extends across the corner region.

10. The lens assembly of claim 7, wherein the reversing turns are adjacent opposite ends of the lens.

11. The lens assembly of claim 1, wherein the lens defines a substantially round shape, and wherein the elongate runs are arranged substantially parallel to a curved edge of the lens.

12. The lens assembly of claim 11, wherein the lens defines an arcuate cross section.

13. The lens assembly of claim 11, wherein the reversing turns are adjacent each other on the lens.

14. The lens assembly of claim 11, wherein the elongate runs are evenly spaced across the surface of the lens.

15. The lens assembly of claim 1, wherein the electrically conductive traces have a cross-section that is taller than it is wide.

16. The lens assembly of claim 1, wherein the electrically conductive traces extend outwardly away from the surface of the lens and have a thickness of at least 0.03 mm.

17. The lens assembly of claim 1, wherein the electrically conductive traces are primarily made of conductive silver ink with a resistance of less than about 500 ohms.

18. The lens assembly of claim 17, wherein the silver ink is opaque.

19. The lens assembly of claim 1, wherein the light transmissive lens defines a curved surface area that is at least 65 square inches.

20. The lens assembly of claim 1, wherein the light transmissive lens is substantially round and about 4 to 4½ inches in diameter.

21. The lens assembly of claim 1, comprising:

a housing coupled to the lens;

a lamp positioned in the housing adjacent the concave inside surface of the lens; and a sealing member between the housing and the lens configured to partially or hermetically seal the housing to the lens with the lamp inside the housing.

* * * * *